United States Patent
Lynch et al.

(10) Patent No.: US 7,587,374 B1
(45) Date of Patent: Sep. 8, 2009

(54) DATA CLUSTERING METHOD FOR BAYESIAN DATA REDUCTION

(75) Inventors: Robert S. Lynch, Old Mystic, CT (US); Peter K. Willett, Coventry, CT (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 576 days.

(21) Appl. No.: 11/387,080

(22) Filed: Mar. 20, 2006

(51) Int. Cl.
*G06F 15/18* (2006.01)
(52) U.S. Cl. ....................................... 706/16
(58) Field of Classification Search ......... None
See application file for complete search history.

(56) References Cited

OTHER PUBLICATIONS

Condition monitoring for helicopter data, Fang Wen; Willett, P.; Deb, S.; Systems, Man, and Cybernetics, 2000, IEEE International Conference on Jul. 10-13, 2006 pp. 1-7 Digital Object Identifier 10.1109/ICIF.2006.301761.*
Use of Bayesian data reduction for the fusion of legacy classifiers, Robert S. Lynch Jr., Peter K. Willett, Information Fusion 4 (2003) 23-24.*
Classification and Feature Selection with Fused Conditionally Dependent Binary Valued Features, Robert S. Lynch Jr., Peter K. Willett, Information Fusion, 2000. Fusion 2000. Proceedings of the Third International Conference on Publication Date: Jul. 10-13, 2000 vol. 1, On pp. MOC1/25-MOC1/31 vol. 1.*
Robert S. Lynch Jr. and Peter K. Willett, Utilizing Unsupervised Learning to Cluster Data in the Bayesian Data Reduction Algorithm, Paper, Symposium on Proceeding of the 2005 SPIESecurity and Defense, Apr. 2005, pp. 1-10, Orlando, FL.
Robert S. Lynch Jr. and Peter K. Willett, Adaptive Classification by Maximizing Class Separability with Respect to the Unlabeled Data, April Paper, pp. 1-11, Orlando, FL.

* cited by examiner

*Primary Examiner*—David R Vincent
*Assistant Examiner*—Ola Olude-Afolabi
(74) *Attorney, Agent, or Firm*—James M. Kasischke; Michael P. Stanley; Jean-Paul A. Nasser

(57) ABSTRACT

This invention is a method of training a mean-field Bayesian data reduction algorithm (BDRA) based classifier which includes using an initial training for determining the best number of levels. The Mean-Field BDRA is then retrained for each point in a target data set and training errors are calculated for each training operation. Cluster candidates are identified as those with multiple points having a common training error. Utilizing these cluster candidates and previously identified clusters as the identified target data, the clusters can be confirmed by comparing a newly calculated training error with the previously calculated common training error for the cluster. The method can be repeated until all cluster candidates are identified and tested.

12 Claims, 5 Drawing Sheets

DATA CLUSTERING METHOD FOR BAYESIAN DATA REDUCTION

STATEMENT OF GOVERNMENT INTEREST

The invention described herein may be manufactured and used by or for the Government of the United State of America for governmental purpose without payment of any royalties thereon or therefore.

BACKGROUND OF THE INVENTION (1) Field of the Invention

This invention relates to a method for classifying data and more particularly to a training method for a Bayesian Data Reduction Algorithm classifier that enables the identification of data clusters.

Classification systems are a type of artificial intelligence systems that are implemented on digital computers. These systems are implemented using neural networks or statistical measures. Implementation on a neural network involves training the neural network to recognize the given classes. As an example, when given an input XI the classification system decides to which class the input X belongs. If known, measurable characteristics separate classes, the classification decision is straightforward. However, for most applications, such characteristics are unknown, and the classification system must decide which output class does the input X most closely resemble. In such applications, the output classes and their characteristics are modeled (estimated) using statistics for the classes derived from training data belonging to known classes. Thus, the standard classification approach is to first estimate the statistics from the given training data belonging to known classes and then to apply a decision rule using these estimated or modeled statistics.

(2) Description of the Prior Art

In many real world classification problems the domain of the observed data, or features, describing each class can be complicated, obscure, and highly overlapped. The result is that the task of discriminating amongst the classes with standard supervised training techniques can be nearly impossible. However, within these difficult domains, it can often be the case that the target class of interest (e.g., data that produce a desired yield and are thus categorized as the target class) contains isolated unknown clusters (subgroups of data points), where the observations within each cluster have similar statistical properties. In these situations classification performance (or, the average yield) can be significantly improved if one develops a classifier to recognize, or mine, observations within the clusters as the target class, and where all other nonclustered observations (i.e., both with and without a desired yield) are considered the alternative class (the non-target class). A benefit of such a classifier is that subsets of target data points, producing a consistent desired average yield, can be recognized with a minimum probability of error. This is in contrast to a traditional classification approach to this problem (i.e., trained in a completely supervised manner) that has the potential to produce a much higher probability of error and a lower average yield.

Bayesian networks, also known as belief networks are known in the art for use as filtering systems. The belief network is initially learned by the system from data provided by an expert, user data and user preference data. The belief network is relearned when additional attributes are identified having an effect. The belief network can then be accessed to predict the effect.

These benefits can be achieved in diverse fields having multi-dimensional data. Large quantities of data are available in the securities market, and it would be valuable to find groups of securities having predefined characteristics such as a certain yield from the available data. Other fields for using such a classification system are target identification, medical diagnosis, speech recognition, digital communications and quality control systems.

Classification systems are a type of artificial intelligence systems that are implemented on digital computers. These systems are implemented using neural networks or statistical measures. Implementation on a neural network involves training the neural network to recognize the given classes. As an example, when given an input X, the classification system decides to which class the input X belongs. If known, measurable characteristics separate classes, the classification decision is straightforward. However, for most applications, such characteristics are unknown, and the classification system must decide which output class does the input X most closely resemble. In such applications, the output classes and their characteristics are modeled (estimated) using statistics for the classes derived from training data belonging to known classes. Thus, the standard classification approach is to first estimate the statistics from the given training data belonging to known classes and then to apply a decision rule using these estimated or modeled statistics.

FIG. 1A illustrates the problem of interest with a straightforward example containing one thousand samples of one dimensional domain data (a single feature). Each data point for the target class, 10, is shown with a "O", and each data point for the non-target class, 12, is shown with a "+". A data cluster 14 is apparent from the FIG. (The data for this figure was generated, for each dimension of each class (i.e., except those within the cluster), to be uniform, independent, and identically distributed. However, with respect to the features each data cluster was generated as Gaussian distributed, with a randomly generated mean, and constrained to be located around the specified "center" yield value.)

Bayesian networks, also known as belief networks are known in the art for use as filtering systems. The belief network is initially learned by the system from data provided by an expert, user data and user preference data. The belief network is relearned when additional attributes are identified having an effect. The belief network can then be accessed to predict the effect.

In this case, the ordinate that defines the yield of each data point is plotted versus the domain, where a yield value of 0.5 is used to separate and define the five hundred samples of the target class (i.e., yield>0.5), and the five hundred samples of the non-target class (yield<0.5). It can clearly be seen in this figure that the two classes are highly overlapped with respect to the range of the single feature. In fact, later it will be shown that traditional supervised classification approaches with this data produce nearly a 0.5 probability of error, and an overall average yield of just slightly more than 0.5. However, notice in FIG. 1A that a cluster 14 of data points also exists in the target class 10 with an average yield of approximately 0.6. Thus, it would be advantageous to develop a classifier for this data that can essentially mine and recognize the positive yielding cluster 14 from all other data points contained in FIG. 1A. One obvious technique to classify the cluster point in this data would be to visually determine threshold points from FIG. 1A; however, typical problems involve multi-dimensional feature spaces that prevent visual determination of thresholds. Any developed technique should be applicable to multi-dimensional feature spaces.

FIG. 1B shows a more generalized illustration of the problem. In FIG. 1B there is a plot containing one thousand samples of one dimensional domain data (a single feature). The data for this figure was generated, for each dimension of each class (i.e., except those within the cluster), to be uniform, independent, and identically distributed. However, with respect to the features each data cluster was generated as Gaussian distributed, with a randomly generated mean, and constrained to be located around the specified center yield value. In FIG. 1B, the ordinate that defines the yield of each data point is plotted versus the domain, where a yield value of 0.5 is used to separate and define the five hundred samples of the target class (i.e., yield>0.5) identified as 10, and the five hundred samples of the nontarget class (yield<0.5) identified as 12.

It can clearly be seen that the two classes contain many commonly distributed points with respect to the range of the single feature. This case differs from the case shown in FIG. 1A in that three clusters of data points, 18A, 18B and 18C, exist within the target class containing actual respective yields of 0.6, 0.75, and 0.9. In this example, each data cluster was randomly placed to be centered somewhere between the yield values of 0.5 and 1, where, as stated previously, the focus of the general embodiment of the method is on mining each of these clusters.

Prior art methods for classifying data are provided in U.S. Pat. Nos. 6,397,200 and 6,789,070. These are incorporated by reference herein. U.S. Pat. No. 6,397,200 provides a data reduction method for a classification system using quantized feature vectors for each class with a plurality of features and levels. The method utilizes application of a Bayesian data reduction algorithm to the classification system for developing reduced feature vectors. Test data is then quantified into the reduced feature vectors. The reduced classification system is then tested using the quantized test data. A Bayesian data reduction algorithm is further provided by computing an initial probability of error for the classification system. Adjacent levels are merged for each feature in the quantized feature vectors. Level-based probabilities of error are then calculated for these merged levels among the plurality of features. The system then selects and applies the merged adjacent levels having the minimum level based probability of error to create an intermediate classification system. Steps of merging, selecting and applying are performed until either the probability of error stops improving or the features and levels are incapable of further reduction.

U.S. Pat. No. 6,789,070 provides an automatic feature selection system for test data with data (including the test data and/or the training data) containing missing values in order to improve classifier performance. The missing features for such data are selected in one of two ways: the first approach assumes each missing feature is uniformly distributed over its range of values, and the second approach increases the number of discrete levels for each feature by one for the missing features. These two choices modify the Bayesian Data Reduction Algorithm for automatic feature selection.

This method for solving the problem in FIG. 1A builds upon and utilizes the previously introduced Mean-Field Bayesian Data Reduction Algorithm (Mean-Field BDRA) based classifier. The Mean-Field BDRA classifier was developed to mitigate the effects of the curse of dimensionality by eliminating irrelevant feature information in the training data (i.e., lowering M), while simultaneously dealing with the missing feature information problem. The mean-field BDRA was first introduced in R. S. Lynch, Jr. and P. K. Willett, "Adaptive Classification by Maximizing the Class Separability with Respect to the Unlabeled Data," Proceedings of the 2003 SPIE Symposium on Security and Defense, Orlando, Fla., April 2003. This paper discloses a method of Bayesian Data Reduction which assigns an assumed uniform Dirichlet (completely non-informative) prior for the symbol probabilities of each class. In other words, the Dirichlet is used to model the situation in which the true probabilistic structure of each class is unknown and has to be inferred from the training data.

The Modified Mean-Field BDRA was developed to better deal with problems in which the class-labeling feature is the primary missing attribute in the training data. In general, this problem greatly complicates the modeling of each class, and to deal with it the mean-field BDRA was created that encourages dissimilar distributions with respect to all missing value data.

The primary aspect of the Mean-Field BDRA (that is, in addition to its data model that incorporates a class-labeling feature) that differentiates it from the original BDRA is its method of dealing with the missing features problem. In the Mean-Field BDRA the missing feature information is adapted by estimating the missing feature from the available training data. The following model provides further detail. Specifically, let z be an N-dimensional vector containing the entire collection of training data for all k classes, and using the Dirichlet distribution based model, this is written as $$f(z) = \int_p \prod_{i=1}^{N} \left[ \sum_{l \in w_i} p_l \right] f(p) \, dp \quad (1)$$

where $p_l$ is the probability of the $l^{th}$ discrete symbol out of a total of M (with p representing all M symbols), f(p) is the Dirichlet distribution prior on the symbol probabilities given by:

$$(M-1)! I_{\{\sum_{l=1}^{M} p_l = 1\}}, \quad (1A)$$

and $w_i$ is the set of all discrete symbols that observation $z_i$ could take on if all possible outcomes of its missing features are substituted in. The notation $I_{\{x\}}$ is the indicator function that has a value of one when "x" is true, and a value of zero otherwise.

Equation (1) represents the optimal approach to solving this problem. However, when expanded, and after integration, Equation (1) results in a sum of products whose number of terms depends upon the number of missing features in the data. That is, there are $$\prod_{i=1}^{N} |w_i|$$

terms in the sum, where $|w_i|$ is the cardinality of the $i^{th}$ feature vector. Thus, with no missing features in any of the data only one term is left over. On the other hand, if N=20 and each feature vector has one missing binary valued feature then Equation (1) would contain $2^{20}$, or approximately one million terms. This of course makes any implementation of this equation impractical.

As an alternative to Equation (1), the distribution contained in it, f(z|p), and given by $$f(z \mid p) = \prod_{i=1}^{N}\left[\sum_{l \in w_i} p_l\right]$$

is replaced with $$f(z \mid p) = \prod_{j=1}^{M} p_j^{x_j}$$

in which $$x_j = \sum_{i=1}^{N} \beta_{i,j} I_{\{j \in w_i\}}, \text{ (i) } \beta_{i,j} \text{ iff } j \notin w_i, \text{ and (ii) } \sum_{j=1}^{M} \beta_{i,j} = 1.$$

It is appropriate to think of each symbol-uncertain datum (i.e., each feature vector missing features) in these equations as being separated into small quanta, with respect to the remaining training data, and apportioned amongst the possible symbols the datum can take on. However, it is preferred here to think of the above equations as a mean-field approximation of the unknowable probability sum.

In general, under mean-field theory the expectation E(f(x)) is replaced by f(E(x)). Thus, identifying "f(x)" as a particular term in the sum of products in Equation (1), meaning a particular configuration of the actual symbols of the symbol-uncertain data, the expected value of this data is added to the appropriate symbol's total number of observations. To accomplish this, the following iterative steps are used (these steps will be referred to as the mean-field recursion):

(i) Begin with $$n = 1, \beta_{i,j}^{(1)} = 0 \forall\, j \notin w_i, \text{ and } \beta_{i,j}^{(1)} = \pi_{i,j} \forall\, j \in w_i$$

where for the $i^{th}$ datum, given an equal initial probability is assigned for all possible uncertain symbols, $$\pi_{i,j} = \frac{1}{|w_i|}.$$

(ii) Take the expectation value to update $$\beta_{i,j}^{(n+1)} = 0 \forall\, j \notin w_i$$

and $$\beta_{i,j}^{(n+1)} = \frac{\left(1 + \sum_{l=1, l \neq i}^{N} \beta_{l,j}^{(n)}\right)\pi_{i,j}}{\sum_{j \in w_i}\left(\left(1 + \sum_{l=1, l \neq i}^{N} \beta_{l,j}^{(n)}\right)\pi_{i,j}\right)} \forall\, j \in w_i$$

(iii) If $$\sum_{i=1}^{N}\sum_{j=1}^{M}(\beta_{i,j}^{(n+1)} - \beta_{i,j}^{(n)})^2 > (\text{Tolerance})$$

then set n=n+1 and go to (ii).

At convergence, $$x_j = \sum_{i=1}^{N} \beta_{i,j}^{(n)}$$

is computed for the number of outcomes of the $j^{th}$ symbol. In general, if the iterative steps given are not utilized (i.e., only step one is used) then this amounts to assigning for the $i^{th}$ datum a hard outcome to all possible uncertain symbols it can be, the $j^{th}$ of which being assigned $\pi_{i,j}$.

Notice that steps (i) through (iii) shown above are similar to the recursive steps utilized in the Expectation Maximization (EM) algorithm. A typical implementation of EM involves using the available data to estimate, or "plug-in," the components of a Gaussian mixture density. However, the recursive steps, above, involve estimation of the $\beta_{i,j}$'s for an algorithm that is approximately Bayesian. In any case, as the EM algorithm has been shown to converge to a solution, it is expected that due to its similar form, the Mean-Field BDRA will also converge.

In seeking best performance for a given data set the dimensionality reduction steps of the BDRA are used after each application of the mean-field recursion described above. That is, the Mean-Field BDRA alternates between reducing irrelevant feature information and "filling-in" missing feature values. The steps of the basic BDRA have been modified to include a class-labeling feature in augmentation to each datum. Recall, the algorithm reduces the quantization complexity to the level that minimizes the average conditional probability of error, P(e|X), and in its modified form it appears as $$P(e \mid X) = \sum_{k=1}^{C}\sum_{y} P(H_k) I_{\{f_k \leq f_l, \text{for all } k \neq l\}} f_k \quad (2)$$

where $$f_k = f(y \mid x_k, H_k) = \frac{N_y!(N_k + M - 1)!}{(N_k + N_y + M - 1)!}\prod_{j \in H_k}\frac{(x_j + y_j)!}{x_j! y_j!};$$

C is the total number of classes with $k \in \{1, \ldots, C\}$;

M is the number of discrete symbols;

$j \in H_k$ is defined as all discrete symbols, j, associated with class k, and with the class-labeling feature is equal to k;

$H_k$ is the hypothesis defined as $p_y = p_{all\ j \in H_k}$, and $$\left\{ \sum_{k=1}^{C} \sum_{j \in H_k}^{M} p_j = 1 \right\};$$

X is the entire collection of training data from all C classes;

$x_j \in H_k$ is the number of occurrences of the $j^{th}$ symbol in the training data defined for all $j \in H_k$;

$$N \left\{ N = \sum_{j=1}^{M} x_j \right\}$$

is the total number of training data, where the fraction belonging to the $k^{th}$ class is given by $$\left\{ N_k = \sum_{j \in H_k} x_j \right\};$$

$y_j$ is the number of occurrences of the $j^{th}$ symbol in the test data;

$$N_y \left\{ N_y = \sum_{j=1}^{M} y_j \right\}$$

is the total number of the test data; and $I_{\{x\}}$ is the indicator function such that $I_{\{x\}}=1$ when x is true and $I_{\{x\}}=0$ when x is false.

Note, the typical situation considered involves one observation of test data (i.e., $N_y=1$), thus, $f(y|x,H_k)$ of Equation (2) becomes $$f(y_i = 1 \mid x, H_k) = \frac{x_{j \in H_k} + 1}{N + M}. \quad (3)$$

Given the above equations, dimensionality reduction (i.e., feature selection) is implemented on the training data using the following iterative steps, which are analogous to backward sequential feature selection.

(i) Apply mean-field recursive steps to the data.

(ii) Using the initial training data with quantization complexity M (e.g., in the case of all binary valued features $M=2^{N_f}$, where $N_f$ is the number of features), Equation (2) is used to compute P(e|X;M).

(iii) Beginning with the first feature (selection is arbitrary), and excluding the class labeling feature, reduce this feature by summing or merging (i.e., marginalizing) the numbers of occurrences of those quantized symbols that correspond to joining adjacent discrete levels of that feature.

(iv) Re-apply mean-field recursive steps to the data.

(v) Use the newly merged training data (it is referred to as X') and the new quantization complexity (e.g., $M'=2^{N_f-1}$ in the binary feature case), and use Equation (2) to compute P(e|X'; M').

(vi) Repeat items (iii), (iv) and (v) for all $N_f$ features.

(vii) From item (vi) select the minimum of all computed P(e|X';M') (in the event of a tie use an arbitrary selection), and choose this as the new training data configuration. (This corresponds to permanently reducing, or removing, the associated feature.)

(viii) Repeat items (iii) through (vii) until the probability of error does not decrease any further, or until M'=2, at which point the final quantization complexity has been found.

The Mean-Field BDRA is modified in this section to improve its performance. Its performance is particularly improved when the adapted training data is missing the class labeling feature. The idea behind the method of the current invention is based on developing a model that encourages dissimilar distributions amongst the classes with respect to all missing feature information. Therefore, given the missing feature values, the new method is designed to give more likelihood to those feature vectors that have dissimilar values.

The modified Mean-Field BDRA is based on the assumptions that the distribution of the true discrete symbol probabilities, $(p_{k,i})$, for the $i^{th}$ discrete symbol of the $k^{th}$ class, are uniformly Dirichlet distributed, and that the form of the underlying new distributional model is given by, $$f(p_{1,i}, p_{2,i}, \ldots, p_{c,i} \mid p_i) = \frac{K}{p_i} \left(\frac{p_{1,i}}{p_i}\right)^{\alpha-1} \left(\frac{p_{2,i}}{p_i}\right)^{\alpha-1} \ldots \left(\frac{p_{c,i}}{p_i}\right)^{\alpha-1} \quad (4)$$

where $$\sum_{k=1}^{C} p_{k,i} = p_i,$$

C is the total number of classes, K is a normalizing constant, and $\alpha$ is a constant that controls the shape of the distribution. Typically, a smaller value of $\alpha$ means more dissimilarity between the distributions of each class.

Given Equation (4), Equation (3) is now redeveloped by writing it as, $$f(y_i = 1 \mid x, H_k) = \int_0^1 \int_0^{p_i} f(y_i = 1, p_i p_{k,i} \mid x, H_k) dp_i dp_{k,i} = \quad (5)$$

$$\int_0^1 \int_0^{p_i} f(y_i = 1 \mid p_i p_{k,i}, x, H_k)$$

$$f(p_{k,i}, \mid p_i, xH_k) f(p_i \mid x, H_k) dp_i dp_{k,i}$$

Equation (5) can also be written as, $$f(y_i=1 \mid x, H_k) = \int_0^1 \int_0^{p_i} f(y_i=1 \mid p_{k,i}, H_k) f(x \mid p_{k,i}, H_k) f(p_{k,i} \mid p_i, H_k) f(p_i \mid x, H_k) dp_i dp_{k,i} \quad (6)$$

where, $$f(y_i = 1 \mid p_{k,i}, H_k) = p_{k,i};$$

$$f(x \mid p_{k,i}, H_k) = \left( \begin{array}{c} \sum_{j=1}^{C} x_{j \in H_{j,i}} \\ x_{j \in H_{k,i}} \end{array} \right) \left( \frac{p_{k,i}}{p_i} \right)^{x_{j \in H_{k,i}}} \left( 1 - \frac{p_{k,i}}{p_i} \right)^{\sum_{j=1}^{C} x_{j \in H_{k,i}}};$$

$$f(p_{k,i} \mid p_i, H_k) = \frac{1}{p_i} \left( \frac{p_{k,i}}{p_i} \right)^{\alpha - 1} \left( 1 - \frac{p_{k,i}}{p_i} \right)^{\alpha - 1};$$

$$f(p_i \mid x, H_k) = \frac{\Gamma(N+M) p_i^{\sum_{j=1}^{C} x_{j \in H_{j,i}}} (1 - p_i)^{N - \sum_{j=1}^{C} x_{j \in H_{j,i}} + M - 2}}{\Gamma\left(\sum_{j=1}^{c} x_{j \in H_{j,i}} + 1\right) \Gamma\left(N - \sum_{j=1}^{C} x_{j \in H_{j,i}} + M - 1\right)}.$$

Using these equations, Equation (6) can now be solved, which produces the result, $$f(y_i = 1 \mid x, H_k) = \qquad (7)$$

$$\frac{\Gamma(x_{j \in H_{k,i}} + \alpha + 1) \Gamma\left(\sum_{j=1}^{C} x_{j \notin H_{k,i}} + \alpha\right) \Gamma\left(\sum_{j=1}^{C} x_{j \in H_{j,i}} + 2\right)}{\Gamma(N+M) \Gamma(x_{j \in H_{k,i}} + 1)} \cdot$$

$$\Gamma\left(\sum_{j=1}^{C} x_{j \notin H_{k,i}} + 1\right) \Gamma\left(\sum_{j=1}^{C} x_{j \in H_{j,i}} + 2\alpha + 1\right)$$

In the results that follow, values for $\alpha = 1$ are to be considered, which produces the following for Equation (7), $$f(y_i = 1 \mid x, H_k; \alpha = 1) = \frac{x_{j \in H_{k,i}} + 1}{(N+M) \left( \sum_{j=1}^{C} x_{j \in H_{j,i}} + 2 \right)}. \qquad (8)$$

In comparing the previous model of Equation (2) to Equation (8), it is apparent that under the new model shown above more emphasis is now placed on dissimilar probabilities for the training data of each class.

The prior art does not disclose a method for training a Mean-Field Bayesian Reduction classifier for detecting clusters in unknown data.

SUMMARY OF THE INVENTION

Accordingly, this invention is a method of training a mean-field Bayesian data reduction algorithm (BDRA) which includes using an initial training for determining the best number of levels. The Mean-Field BDRA is then retrained for each point in a target data set and training errors are calculated for each training operation. Cluster candidates are identified as those with multiple points having a common training error. Utilizing these cluster candidates and previously identified clusters as the identified target data, the clusters can be confirmed by comparing a newly calculated training error with the previously calculated common training error for the cluster. The method can be repeated until all cluster candidates are identified and tested.

These and other features, aspects and advantages of the present invention will become better understood with reference to the following drawings, description and claims.

DETAILED DESCRIPTION OF THE INVENTION

Figure 1A:
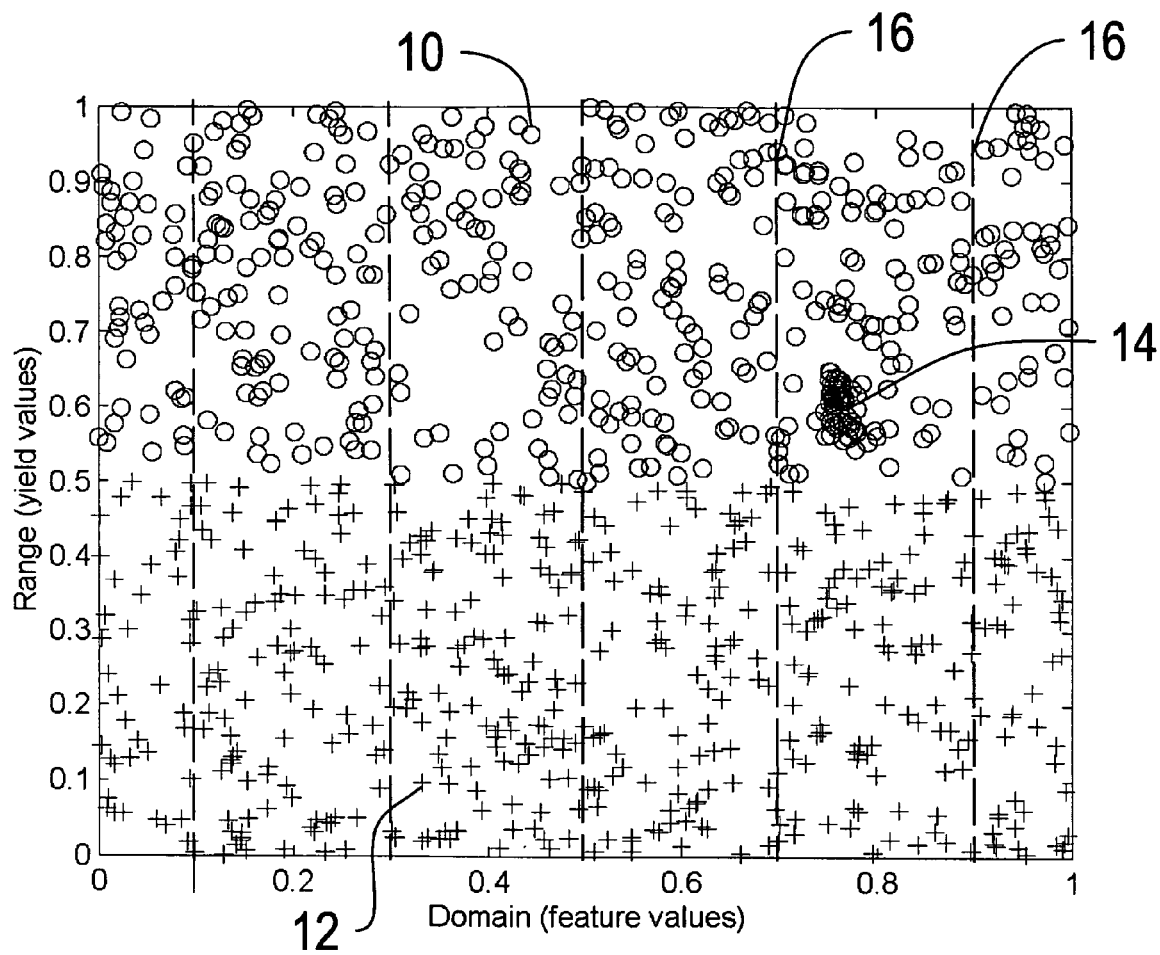
FIG. 1A shows data illustrating the problem of the invention for the case having a single cluster.

The modified version of the Mean-Field BDRA disclosed in the prior art is used as the basis for a new method to solve the problem shown in FIG. 1A because of its superior performance with difficult unsupervised training situations. To further develop the new technique, a new training method is developed for the modified algorithm that enables it to mine the domain of an unlabeled set of data points for clusters. The new training method utilizes a combination of unsupervised and supervised training, and a sequential data search to localize all points within the cluster. In general, all results shown for the methods developed here with the Mean-Field BDRA will be based on simulated data like that shown in FIG. 1A. However, this approach is equally applicable to real-life data sets.

Typical domain data can have any number of features so that a given cluster may exist across all dimensions of the feature space, or across some subset of features within that space. Thus, the built-in dimensionality reduction aspects of the Mean-Field BDRA are useful for isolating the data cluster. Further, as the Mean-Field BDRA is a discrete classifier, it naturally defines threshold points in multi-dimensional space that isolate the relative location of the cluster.

The automatic algorithm developed here to locate data clusters strongly relies on the Mean-Field BDRA's training metric, P(e). This is given above as equation (2), above. Using this, quantization complexity is reduced to the level that minimizes the average conditional probability of error, P(e|X).

The idea is that because the Mean-Field BDRA discretizes all multi-dimensional feature data into quantized cells (or levels), any data points that are common to a cluster 14 will share the same discrete cell, which also assumes that appropriately defined quantization thresholds have been determined by the Mean-Field BDRA. These are shown as dashed lines 16 in FIG. 1A. Therefore, given all, or most, cluster data points can be quantized to share a common discretized cell they will all also share a common probability of error metric, P(e).

In other words, locating cluster data points can be based on developing a searching method that looks for data points sharing a common P(e). In this case, it is expected that this common P(e) value, for all points within the cluster 14, will be relatively small with respect to that computed for most other data points outside of the cluster. This latter requirement should be satisfied in most situations as data clusters should tend to be distributed differently with respect to data outside of the cluster. As a final step in training, the validity of each cluster can be checked by computing the overall average yield for all points within the cluster (i.e., any grouped data points producing the largest average yield are chosen as appropriately mined data clusters).

Figure 2:
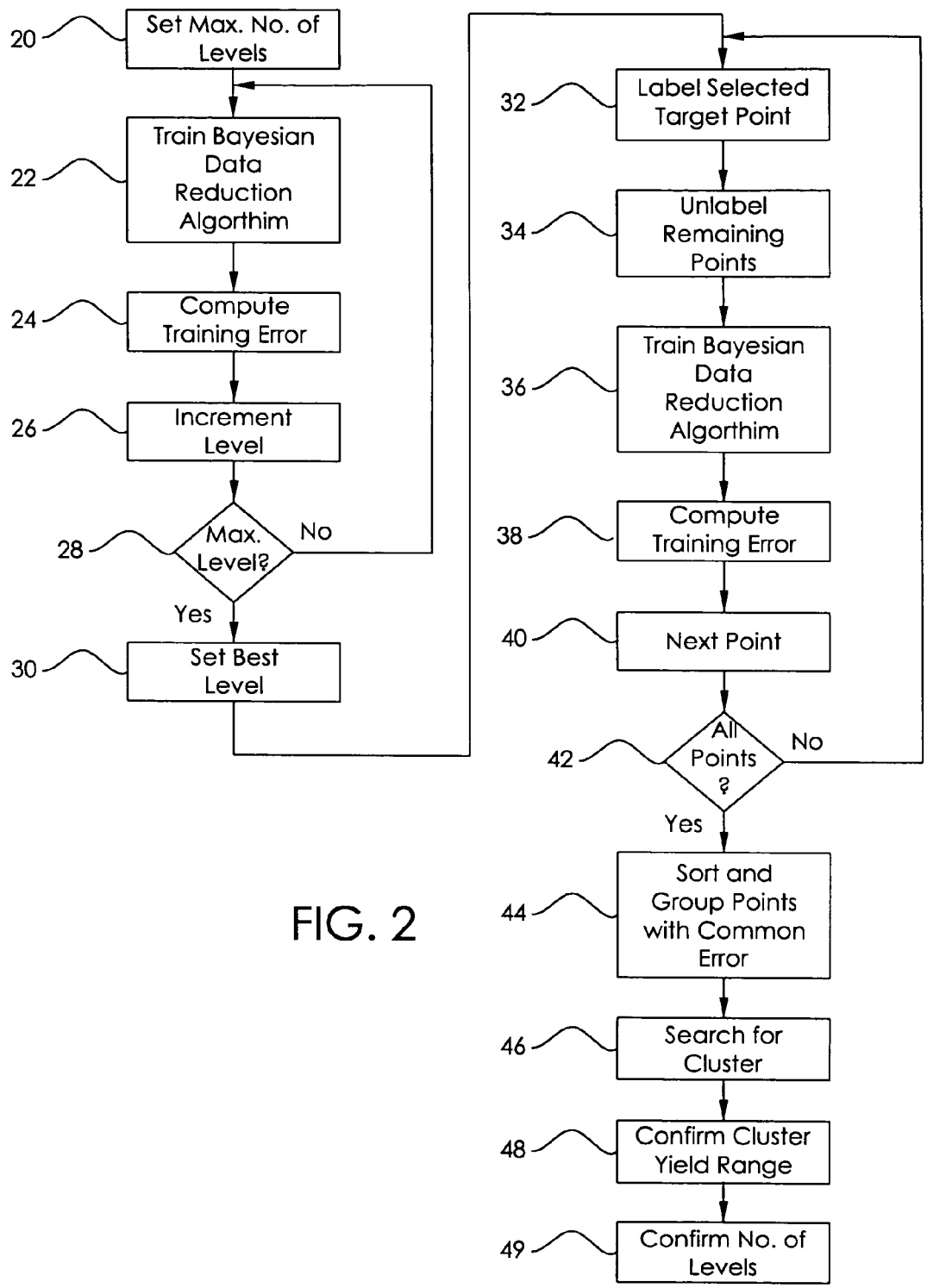
FIG. 2 shows the method of the invention for locating a single cluster.

To improve results, the steps shown in FIG. 2 and described below have been developed for training the Mean-Field BDRA, that is, in such a way that the data cluster is identified with a minimum probability of error. For each of these steps training will proceed in a semi-unsupervised manner in that all target data (yield>0.5) identified as 10 is utilized without class labels (i.e., no class information at all), and all non-target data (yield<0.5) identified as 12 is utilized with class labels (full class information). The motivation for training in this way is to force the Mean-Field BDRA to readily recognize the contrast between target cluster data points 14 and all other data points in both classes 10 and 12 that are not like the cluster. In this way, when adapting class labels for the target class the Mean-Field BDRA is more likely to label cluster data points as target, while grouping most other non-cluster target data points with the non-target. The new method of training proceeds with the following steps.

Initially, a maximum number of levels should be set as in step 20. A user can provide this maximum based on the available amount of computing resources, the time required for completion or by some characteristic of the data. This maximum can also be computed from these attributes. In step 22, using all available training data (i.e., with all target points unlabeled and all non-target points labeled), the Mean-Field BDRA is separately trained for each level. The levels are shown for illustrative purposes in FIG. 1A by dashed lines 16. After training the Mean-Field BDRA, the training error is computed in step 24. The number of levels is incremented in step 26. Step 28 continues the process until the maximum number of levels is reached. From the separate training runs, the method chooses the initial number of discrete levels to use for each feature as that producing the least training error (see Equation (2), above) in step 30. In the next stage of training, the Mean-Field BDRA is trained for each target data point. In step 32, a target data point is labeled with the correct target label. The remaining data points are unlabeled in step 34. The Mean-Field BDRA is trained in step 36 with this labeling, and training error is computed for each point in step 38. Step 40 proceeds to the next point, while step 42 loops through the routine until the Mean-Field BDRA has been separately trained for each training data point. Notice that these steps produce a set of $N_{target}$ computed training errors equal to the number of target training data points.

The next group of steps is utilized to identify the clusters from the computed training errors. Target data points are sorted by training error and grouped in step 44. Step 46 chooses all data points that have both the smallest common training error and the most number of data points from the set of $N_{target}$ computed training errors. These data points are candidate cluster data points and are accepted or rejected, for example, with the problem of FIG. 1A, by checking the commonality of associated yield values in step 48.

Notice that it is possible that in some problems multiple data clusters can be found in this way. That is, if more than one candidate cluster appears to have points with more than one minimum error probability value. In this case, data points common to each cluster can be grouped according to accepted yield values.

As a final step, in step 49, the training is finished by refining the computed number of levels. In this step, all cluster data points found in step 48 are labeled as target, and all other target data points are unlabeled. The Mean-Field BDRA is then retrained to recognize this data. This step fine-tunes the best initial number of discrete levels to use for each feature by the Mean-Field BDRA.

To extend the idea described above to finding multiple unknown clusters, it is required for the new method to have the ability to intelligently sort through and separate data points having common error probabilities. In this case, both the total number of clusters and the number of samples per cluster are assumed to be unknown to the classifier. Therefore, with multiple data clusters, each error probability value must now be thought of as an indicator to each point within each cluster. Restated, it is expected that with multiple clusters all data points within each separate thresholded cluster region will share common error probability values. These common error probability values will be relatively small with respect to those computed for most other data points outside of any clusters. In general, the degree to which this latter requirement is satisfied depends on how differently the clusters tend to be distributed with respect to the non-clustered data. As data within a cluster becomes distributed more like the data outside of the cluster, it becomes less distinguishable. Unknown clusters within a data set will be distinguishable by being distributed differently with respect to all other data points outside of the clusters. Notice that these methods exploit this important assumption.

Therefore, a proper data mining algorithm of multiple clusters, and one that is based on the Mean-Field BDRA, will have a higher likelihood of finding leading cluster candidates by focusing on the largest groups of data points that cluster around smaller common error probability values. As the sorting, or mining, continues in this way any data points associated with small error probabilities and that have few common data points are rejected as cluster members. The algorithm will be designed to automatically stop when all unknown data clusters have been found, or when the training error begins to increase. Finally, and as in the single cluster case, the validity of each cluster with respect to the training data can be checked by computing the overall average yield for all points within the cluster.

Figure 1B:
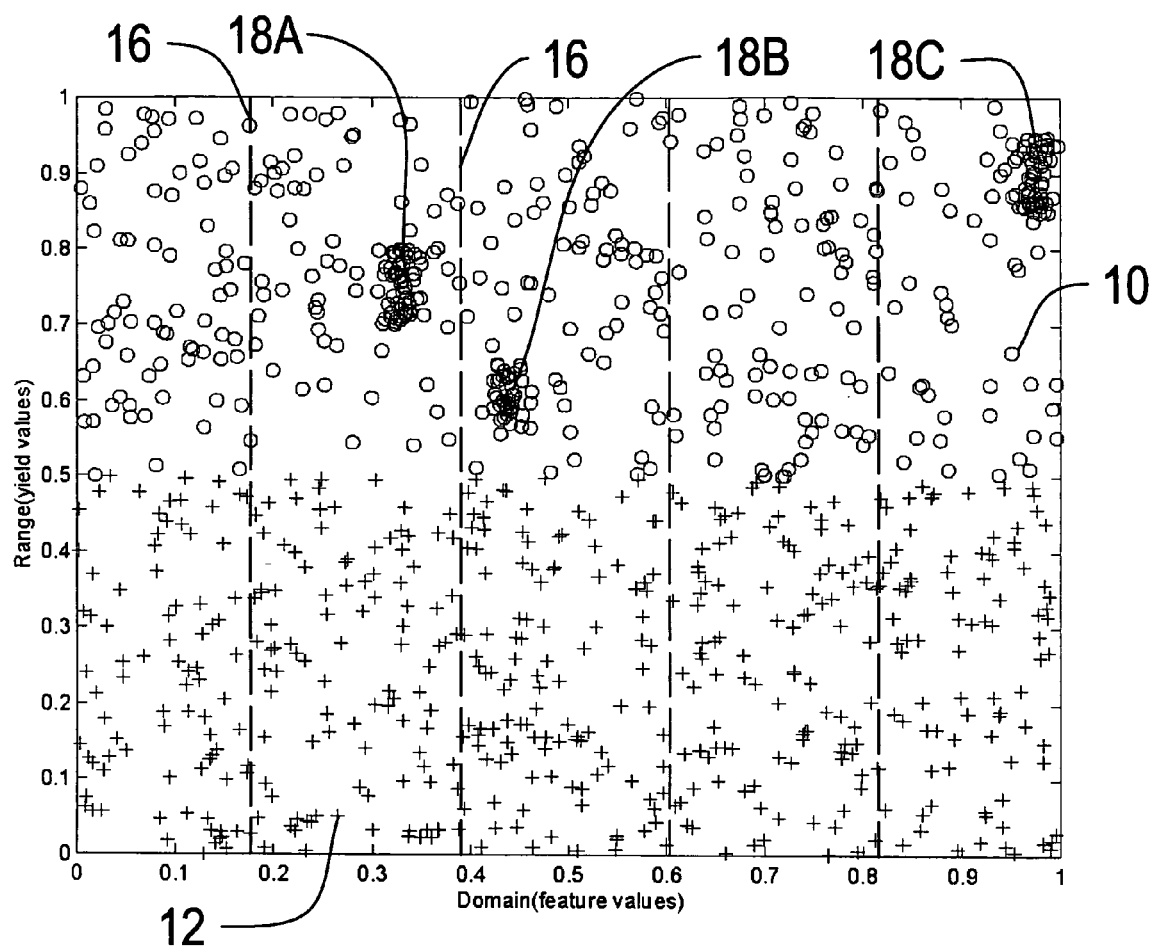
FIG. 1B shows data illustrating the problem of the invention for the case having a multiple clusters.
Figure 3A:
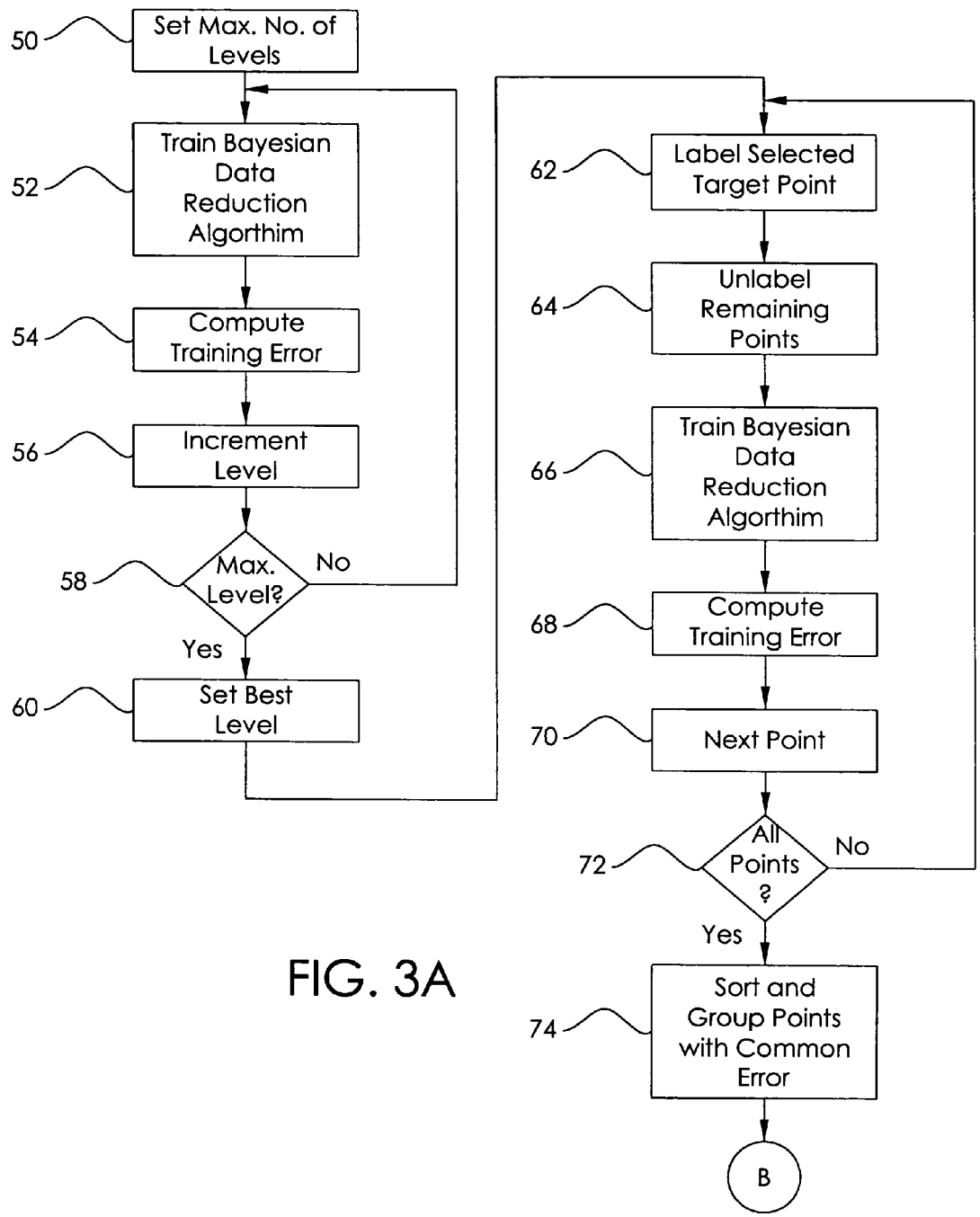
FIGS. 3A and 3B show the method of the invention for locating multiple clusters.
Figure 3B:
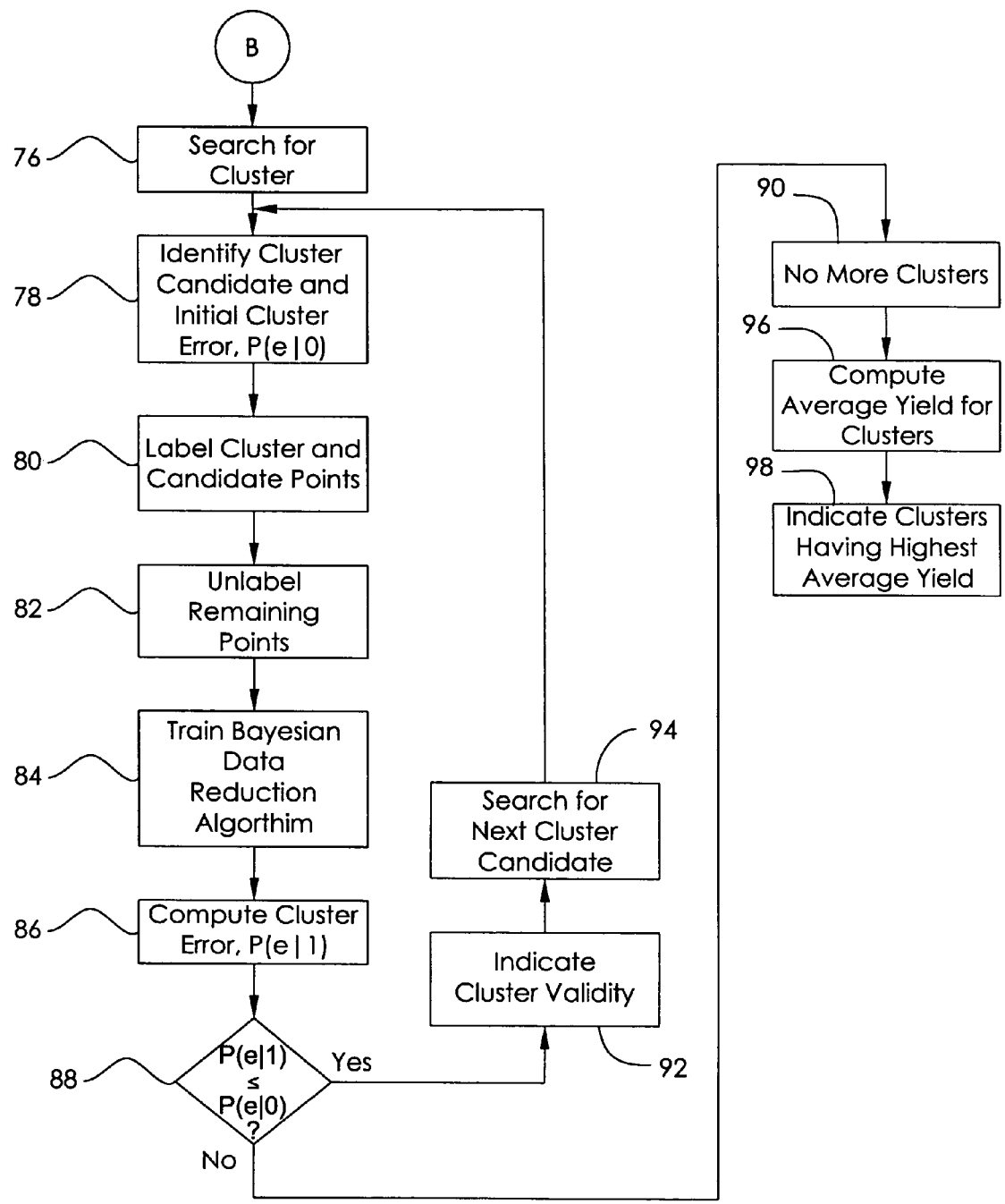

The steps shown below have been developed for training the new multiple cluster classifier using the Mean-Field BDRA, that is, in such a way that all unknown data clusters are identified with a minimum probability of error. These steps are detailed in the flow chart given as FIGS. 3A and 3B. For each of these steps training proceeds in a semi-unsupervised manner in that all target data (yield>0.5) identified as 10 in FIG. 1B is utilized without class labels (i.e., no class information at all), and all non-target data (yield<0.5) identified as 12 is utilized with class labels (full class information). The motivation for training in this way is to force the Mean-Field BDRA to readily recognize the contrast between target cluster data points such as 18A, 18B and 18C and all other data points in both classes that are not like the cluster. Therefore, when adapting class labels for the target class the Mean-Field BDRA is more likely to label any cluster data points as target, while grouping most other non-cluster/target data points with the non-target. The new method of training proceeds with the following steps for each feature of interest.

Initially, a user selects a maximum number of levels for the algorithm in step 50. This selection depends on type and amount of data and the available computing resources. For the example shown here, the maximum level is set as twenty. Typically, it is desired to train with as many initial levels as the data will support for best results. As above, this can be set by a user or calculated based on preferences. Using all available training data (i.e., with all target points unlabeled and all non-target points labeled), the Mean-Field BDRA is trained, separately for each level, step 52. For the results shown here, "all available" training data means 50% of the entire data set. After training, step 54 computes the training error for that level. The number of levels is incremented in step 56 until the preset maximum level is exceeded, step 58.

From the iterated training runs for each level, the initial number of discrete levels to use for each feature is chosen as the number of levels that produces the least training error, step 60. (See Equation (2)). Notice that the idea of steps 50-60 is to find the best initial number of discrete levels to use for each feature prior to looking for individual clusters.

The next steps of the method train the Mean-Field BDRA to identify clusters in the data. A first target data point is labeled in step 62 and the remaining points are left unlabeled in step 64. The Mean-Field BDRA, is retrained in this manner in step 66. A cluster-training error is computed after training for each target data point in step 68. This error is computed based on counting the number of wrong decisions made under each hypothesis. The method then proceeds to the next point in step 70. Step 72 returns back to step 62 until processing of all target data points is complete. Thus, step 68 produces a set of $N_{target}$ computed training errors equal to the number of target training data points.

In step 74, the set of $N_{target}$ computed cluster-training errors in steps 62-72 are sorted and grouped according to those having common error values. The final list of separate cluster-training errors should proceed from the smallest error to the largest error. All data points that share each error should be identified. This step helps to reveal those data points that are sharing a similar region in quantized feature space.

Step 76 conducts a cluster search and looks for the first data cluster candidate using the list obtained in step 72, above. In step 78, the first data cluster candidate is chosen as the one having simultaneously the smallest cluster-training error and the largest number of common data points. Typically, the first error value on the list has both the absolute smallest error and the largest number of common points. However, because the algorithm is suboptimal, this does not have to always be the case. Optionally, the user can set a minimum number of data points for each cluster. Once the cluster is selected, the error associated with all points of this first cluster candidate are identified as $P(e|0)$.

After selecting the first cluster candidate in step 78, preexisting cluster candidates and current cluster points are all labeled in step 80. All points not associated with the current or previous cluster candidates are unlabeled in step 82. The Mean-Field BDRA is then retrained in step 84. A new cluster-training error is computed in step 86. This error is identified as $P(e|1)$. Steps 80-86 determine how statistically similar the selected group of training data points are with each other, or, on the other hand, how different this group is with respect to the non-target class (which now includes all other target data points outside of the cluster).

In step 88, $P(e|1)$ and $P(e|0)$ from steps 86 and 78 are compared. If $P(e|1) \leq P(e|0)$, as it should be in most cases containing data clusters, one can conclude that the current cluster is a valid data cluster and proceed to process for additional clusters. Otherwise, one can conclude that no substantial data clusters exist in step 90, and terminate the algorithm.

When the current cluster is valid, this is indicated in step 90. A search is conducted for the next cluster candidate in step 92 according to the previously stated criteria excluding all points in the first cluster. This new group of points will have simultaneously the next smallest cluster-training error and the largest number of common data points. Steps 78-88 and 92-94 are then repeated until the current error is greater than the initially computed error as found in step 86. It is important to note that these steps always utilize and train with all previously determined clusters from the previous steps marked. Upon terminating the algorithm, the average yield for each cluster is computed in step 96 and, if applicable, step 98 is performed selecting those clusters producing the largest overall yield. The training method results in a trained mean-field BDRA classifier that is capable of recognizing data clusters in the target region.

Table 1, below, shows classification performance results for the Mean-Field BDRA (i.e., w/o a cluster mining algorithm applied) with supervised training (i.e., data with yields greater than 0.5 are called target and those with yields less than 0.5 are called non-target), for single cluster data of the type shown in FIG. 1A. Appearing in this table is the average probability of error computed on an independent test set (50% training/50% test), and the average associated yield (shown in parentheses) obtained from data classified as the target class. Each entry in the table is shown as a function of the true mean yield value, $c_{mean}$, per dimension, of the data cluster (where the two entries in braces, f g, shows the initial number of discrete levels used for each feature by the Mean-Field BDRA), respectively, for one, $l_{init(1)}$ and four, $l_{init(4)}$, dimensional data spaces. Also appearing in this table is the total number of features, $n_{total}$, in the data space, where the true number of those features relevant to the data cluster, $n_{relevant}$ is shown in brackets, [ ]

TABLE 1

| | $n_{total}[n_{relevant}]$ | |
|---|---|---|
| $c_{mean}$ $\{l_{init(1)}, l_{init(4)}\}$ | 1[1] | 4[1] |
| 0.6 {9, 8} | 0.478(0.495) | 0.500(0.476) |
| 0.9 {10, 9} | 0.480(0.528) | 0.494(0.512) |

It can be seen in Table 1 that average classification results are poor when all of the training data are labeled correctly and training proceeds in a supervised manner. This is significant as the results in this table were obtained by partitioning the available data into 50% training and 50% test sets, which highlights the difficulty of the classification problem shown in FIG. 1A. Observe that the exact location of the cluster seems to make very little difference to the overall average probability of error, and average yield, no matter how many features are contained in the data. Even in the case when three additional irrelevant features are added to the data, $n_{total}=4$, the results are very similar for both actual cluster locations.

As a final observation in Table 1, notice that the initial number of discrete levels per feature was chosen to be either eight, nine, or ten by the Mean-Field BDRA for either the one or four dimensional cases. For the supervised training case shown in this table, the initial number of discrete levels used for each feature was chosen to be consistent with that used below in obtaining the modified results of Table 2. In all cases, when obtaining these results the actual number of initial discrete levels per feature was incrementally varied between two and ten by the Mean-Field BDRA. The final values shown were determined by the Mean-Field BDRA to be those that produced the smallest training error with the clustering algorithm applied.

Table 2 shows classification performance results for the Mean-Field BDRA (with the cluster mining algorithm applied), and semi-supervised training (i.e., all cluster data points are labeled as target, and all unclustered target data points and all non-target data points are unlabeled), for single cluster data of the type shown in FIG. 1A. Appearing in this table is the average probability of error computed on an independent test set (50% training/50% test), and the average associated yield (shown in parentheses) obtained from data classified as the target class. Each entry in the table is shown as a function of the true mean yield value, $c_{mean}$, per dimension, of the data cluster (where the two entries in braces, f g, shows the initial number of discrete levels used for each feature by the Mean-Field BDRA), respectively, for one, $l_{init(1)}$, and four, $l_{init(4)}$, dimensional data spaces. Also appearing in this table is the total number of features, $n_{total}$, in the data space, where the true number of those features relevant to the data cluster, $n_{relevant}$ is shown in brackets, [ ].

TABLE 2

| $c_{mean}$ {$l_{init(1)}$, $l_{init(4)}$} | $n_{total}[n_{relevant}]$ 1[1] | 4[1] |
|---|---|---|
| 0.6 {9, 8} | 0.030(0.582) | 0.046(0.547) |
| 0.9 {10, 9} | 0.019(0.749) | 0.022(0.746) |

In Table 2, it can be seen that when the cluster mining method is applied, average classification results have dramatically improved over that shown in Table 1. That is, not only have error probabilities been substantially reduced but average yields have also been significantly increased. For example, notice in Table 1 that with a true cluster location of 0.6, and for both the one and four dimensional cases, the average yield is less than 0.5. However, in Table 2, and after the cluster algorithm is applied, it can be seen that the average yield has been increased to be much closer to the true value of 0.6. Notice that a similar significant performance improvement occurs for a true cluster location of 0.9.

It is interesting to note that in obtaining the yield results of Table 2, the Mean-Field BDRA classifier labeled an average of fifty four data points as target (i.e., belonging to the cluster). In Table 1, the Mean-Field BDRA called an average of two hundred forty eight points the target. In other words, the clustering algorithm was able to significantly increase the average yield of the data with only slightly more than twenty percent of the number of data points. Thus, the clustering algorithm is utilizing the data much more efficiently to predict a gain in yield in unlabeled data. However, there still are some "false alerts" with the clustering method as other data points share the exact same feature space as those within the cluster. The fine tuning of threshold locations shown as the last step in the clustering algorithm above helps to reduce these false declarations by more precisely locating the best initial discrete levels to use by the Mean-Field BDRA.

In Table 3, classification performance results are illustrated for the Mean-Field BDRA (i.e., w/o a cluster mining algorithm applied) with supervised training (i.e., data with yields greater than 0.5 are called target and those with yields less than 0.5 are called non-target), for two and three cluster data of the type shown in FIG. 1B. Appearing in this table is the average probability of error computed on an independent test set (50% training/50% test), for the respective number of unknown clusters shown. In this case, supervised training results appear for both unclustered (i.e., the classifier has no knowledge about the data clusters), and clustered (i.e., the classifier knows all data points in each cluster, and these are the only points labeled as target). In producing these results the Mean-Field BDRA trains with twenty initial discrete levels of quantization.

TABLE 3

| Number of clusters | Supervised Unclustered | Supervised Clustered |
|---|---|---|
| 2 | 0.400 | 0.104 |
| 3 | 0.388 | 0.126 |

Table 3 illustrates the interesting aspects of this data with regard to classifying data that contains isolated clusters. Observe in this table that average classification results are poor when all of the training data are labeled correctly, and training proceeds in a supervised manner (see the unclustered results column), given the classifier has no knowledge about any data clusters. However, it can also be seen (see the clustered results column) that performance improves dramatically when the classifier is given precise knowledge about the location of all points within the data clusters.

The error probabilities in Table 3 indicate that there is only a slight difference in the results if the data contains either two or three clusters, such as the data shown in FIG. 1B. For example, with the unclustered results the three cluster case is slightly better as more clusters are providing information to help discriminate the classes (as a comparison to this, in Table 1 single cluster results using supervised training produced an error probability of near 0.5). When the classifier is given knowledge about the points within each cluster, the two cluster case appears to perform slightly better. In this situation, with three clusters an increasing number of isolated quantized cells also causes more false positive classifications to occur in the regions containing all clusters.

As a final observation in Table 3, notice that the initial number of discrete levels per feature was chosen to be twenty by the Mean-Field BDRA. For the supervised training case shown in this table, the initial number of discrete levels used for each feature was chosen to be consistent with that used below in obtaining the modified results of Table 4. In all cases, when obtaining these results the actual number of initial discrete levels per feature was incrementally varied between two and twenty by the Mean-Field BDRA. The final value of ten shown was determined by the Mean-Field BDRA to be those that produced the smallest training error with the clustering algorithm applied.

TABLE 4

| Number of clusters | Unsupervised Mean-Field BDRA | Supervised Clustered |
|---|---|---|
| 2 | 0.110 | 0.104 |
| 3 | 0.134 | 0.126 |

In Table 4, classification performance results appear for the Mean-Field BDRA (i.e., with a cluster mining algorithm applied) and unsupervised training (i.e., using the algorithmic steps described above), for two and three cluster data of the type shown in FIG. 1B. Appearing in this table is the average probability of error computed on an independent test set (50% training/50% test), for the respective number of unknown clusters shown. Notice, that for comparison the error probabilities are repeated for the supervised clustered case of Table 3. Observe that the utility of the data clustering algorithm developed here can clearly be seen in the results of Table 4. Observe for both the two and three cluster cases, that the error probability of the cluster mining algorithm is only about one percent higher than it is for the clustered supervised classifier that knows everything. This is significant because the cluster mining algorithm used here has no prior information at all about the clusters.

TABLE 5

| Number of clusters | Unsupervised Mean-Field BDRA | Supervised Unclustered |
|---|---|---|
| 1 | 0.666 | 0.512 |
| 2 | 0.608 | 0.555 |
| 3 | 0.622 | 0.588 |

Table 5 shows average yield results for the multiple cluster cases of Tables 3 and 4, and for comparison previously obtained single cluster results are also shown. In each of these cases, the actual average yield for all data clusters is 0.75. Appearing for two and three clusters are computed average yields for the unsupervised Mean-Field BDRA based classifier of Table 3, and the supervised unclustered classifier of Table 1. For the single cluster case, yield values are based on averaging the one-dimensional results for actual cluster yields of 0.6 and 0.9. From this table, it can be seen that the cluster mining algorithm developed here is improving the overall average yield for all numbers of clusters over that of the supervised classifier. This implies that the new algorithm is improving the quality of the decisions in that it is declaring a proportionately larger ratio of high yielding data points as the target. However, notice also that as the number of clusters increases yield performance of the supervised classifier improves with respect to that of the unsupervised Mean-Field BDRA. Intuitively, as more clusters appear in the data classification performance with supervised training should improve as each cluster provides additional information. This implies that in some cases it might be best for an algorithm such as the Unsupervised Mean-Field BDRA to mine for clusters individually, as opposed to collectively as a group.

In summary, this invention provides a new cluster mining algorithm which has been developed for the Mean-Field Bayesian Data Reduction Algorithm (BDRA). The new method works by utilizing a semi-unsupervised method (only non-target training data points were completely labeled), and an iterative sequential search through the target data, to locate features that are clustered relative to all other target and non-target features within the data set. For the simulated data generated here, clustering was typically based on two defined goodness metrics. In particular, the clustering was based both on reducing the relative training error and on improving the overall predicted yield of the data (clusters were located within target locations where yield values were greater than 0.5). In all cases, classification results revealed that the new clustering algorithm improved performance (over the conventional supervised training method) by significantly reducing the average predicted probability of error, and average predicted yield, for independent evaluation data. (Typically, data outside of a cluster will have a more random distribution of error probability values that will not necessarily associate with a common yield value.)

It should be understood, of course, that the foregoing relates to preferred embodiments of the invention and that modifications may be made without departing from the spirit and scope of the invention as set forth in the following claims.

What is claimed is:

1. A method of training a mean-field Bayesian data reduction classifier implemented on a computer with available training data having target data points and non-target data points, said method comprising the steps of:

selecting a best initial number of levels;

training the mean-field Bayesian data reduction classifier once for each target data point at the best initial number of levels with the subject target data point labeled and all other points unlabeled;

computing a cluster training error while training the mean-field Bayesian data reduction classifier for each target data point so that each target data point has an associated cluster training error;

sorting target data points by associated cluster training error so that target data points having the same cluster training error are grouped together;

selecting a cluster candidate as grouped target data points having a low cluster training error and a high number of target data points, the low cluster training error being identified as a first cluster training error;

training the mean-field Bayesian data reduction classifier at the selected best initial number of levels with the cluster candidate points labeled and unlabeling remaining target data points;

computing a second cluster training error while training the mean-field Bayesian data reduction classifier for the cluster candidate points;

comparing the second cluster training error with the first cluster training error;

confirming the cluster candidate if the first cluster training error is greater than the second cluster candidate training error; and producing a trained Bayesian Data Reduction classifier capable of identifying clusters in unlabeled data from said confirmed cluster candidate.

2. The method of claim 1 wherein said step of selecting a best initial number of levels comprises:

setting a maximum number of levels and a minimum number of levels;

training the mean-field Bayesian data reduction classifier with all non-target data points labeled by class and all target data points unlabeled for each number of levels as the number of levels is incrementally varied from the minimum to the maximum number of levels;

computing a training error for each number of levels; and selecting a best initial number of levels as the number of levels having the lowest computed training error.

3. The method of claim 2 further comprising:

repeating the step of selecting a cluster candidate, training the mean-field Bayesian data reduction classifier at the best initial number of levels with the cluster candidate points labeled, computing a second cluster training error, comparing the second cluster training error with the first cluster training error, and confirming the cluster if the first cluster training error is greater than the second cluster candidate training error until the second cluster training error exceeds the first cluster training error; and wherein the cluster candidate is the group of target data points having the next lowest cluster training error and the next highest number of target data points, the lowest cluster training error being identified as a first cluster training error.

4. The method of claim 3 further comprising:

obtaining a desired cluster number from the user; and terminating the method when the number of confirmed clusters exceeds the desired cluster number.

5. The method of claim 3 further comprising:

obtaining a desired maximum point number from the user; and terminating the method when the number of points in the cluster candidate exceeds the desired maximum point number.

6. The method of claim 3 further comprising:
obtaining a desired minimum yield from the user; and
wherein said step of confirming the cluster further comprises:
computing an average cluster yield from the cluster candidate points;
comparing the average cluster yield against the desired minimum yield; and
discarding the cluster if the average cluster yield is less than the desired minimum yield.

7. A method of training a mean-field Bayesian data reduction classifier implemented on a computer with available training data having target data points and non-target data points, said method comprising the steps of:
setting a maximum number of levels and a minimum number of levels;
training the mean-field Bayesian data reduction classifier with all non-target data points labeled by class and all target data points unlabeled for each number of levels as the number of levels is incrementally varied from the minimum to the maximum number of levels;
computing a training error for each number of levels;
selecting a best initial number of levels as the number of levels having the lowest computed training error;
training the mean-field Bayesian data reduction classifier once for each target data point at the best initial number of levels with the subject target data point labeled and all other points unlabeled;
computing a cluster training error while training the mean-field Bayesian data reduction classifier for each target data point so that each target data point has an associated cluster training error;
sorting target data points by associated cluster training error so that target data points having the same cluster training error are grouped together;
selecting a cluster candidate as grouped of target data points having a low cluster training error and a high number of target data points, the low cluster training error being identified as a first cluster training error;
training a mean-field Bayesian data reduction classifier at the best initial number of levels with the cluster candidate points labeled and unlabeling remaining target data points;
computing a second cluster training error while training the mean-field Bayesian data reduction classifier for the cluster candidate points;
comparing the second cluster training error with the first cluster training error;
confirming the cluster if the first cluster training error is greater than the second cluster candidate training error; and
producing a trained Bayesian Data Reduction classifier capable of identifying clusters in unlabeled data from said confirmed cluster candidate.

8. The method of claim 7 further comprising:
repeating the step of selecting a cluster candidate, training the mean-field Bayesian data reduction classifier at the best initial number of levels with the cluster candidate points labeled, computing a second cluster training error, comparing the second cluster training error with the first cluster training error, and confirming the cluster if the first cluster training error is greater than the second cluster candidate training error until the second cluster training error exceeds the first cluster training error;
wherein the cluster candidate is the group of target data points having the next lowest cluster training error and the next highest number of target data points, the lowest cluster training error being identified as a first cluster training error.

9. The method of claim 8 further comprising:
obtaining a desired cluster number from the user; and
terminating the method when the number of confirmed clusters exceeds the desired cluster number.

10. The method of claim 8 further comprising:
obtaining a desired maximum point number from the user; and
terminating the method when the number of points in the cluster candidate exceeds the desired maximum point number.

11. The method of claim 8 further comprising:
obtaining a desired minimum yield from the user; and
wherein said step of confirming the cluster further comprises:
computing an average cluster yield from the cluster candidate points;
comparing the average cluster yield against the desired minimum yield; and
discarding the cluster if the average cluster yield is less than the desired minimum yield.

12. A method of training a mean-field Bayesian data reduction classifier implemented on a computer with available training data having target data points and non-target data points, said method comprising the steps of:
setting a maximum number of discrete levels;
training the mean-field Bayesian data reduction classifier with all non-target data points labeled by class and all target data points unlabeled for each number of levels as the number of levels is incrementally varied from two to the maximum number of levels;
computing a training error for each number of levels;
selecting a best initial number of levels as the number of levels having the lowest computed training error;
training the mean-field Bayesian data reduction classifier once for each target data point at the best initial number of levels with the subject target data point labeled and all other points unlabeled;
computing a cluster training error while training the mean-field Bayesian data reduction classifier for each target data point so that each target data point has an associated cluster training error;
choosing all target data points from the target data point data having both the smallest common cluster training error and the greatest number of data points as candidate cluster data;
establishing a yield threshold tolerance for clusters;
checking the commonality of yield values associated with candidate cluster data against the yield threshold tolerance to indicate acceptance of the candidate cluster as a cluster;
redefining the number of levels by training the mean-field Bayesian data reduction classifier with all clusters labeled as target and all other target data points unlabeled; and
producing a trained Bayesian Data Reduction classifier capable of identifying clusters in unlabeled data from said confirmed cluster candidate.

* * * * *